United States Patent Office 2,928,814

Patented Mar. 15, 1960

2,928,814

POLYMERIZATION OF GASEOUS OLEFINS BY MEANS OF A CATALYST CONSISTING ESSENTIALLY OF AN OXYGEN TREATED BAUXITE

Ivor W. Mills, Glenolden, and William A. Gallup, Media, Pa., assignors to Sun Oil Company, Philadelphia, Pa., a corporation of New Jersey No Drawing. Application June 29, 1956
Serial No. 594,677

14 Claims. (Cl. 260—88.2)

This invention relates to the polymerization of normally gaseous olefins to form solid polymers, and is more particularly directed to a process for the production of solid polymers of ethylene or propylene, or solid copolymers of ethylene and propylene, by contacting the olefinic material with a specific solid catalyst in the presence of oxygen.

The preparation of solid polymers of olefins by use of a variety of catalysts, or polymerization initiators, has heretofore been described. For example, use of small amounts of oxygen, generally less than about 0.1%, at pressures of above about 1,000 atmospheres has been described as effective for obtaining solid polymers of ethylene. The use of solid catalysts, such as metal oxides, which are effective for preparing solid polymers of ethylene has also been described. In prior processes using solid catalysts, the presence of oxygen is generally excluded from the process. These prior processes have not proved entirely satisfactory. Difficulties include, for example, the necessity of using special, expensive catalysts in which the metal of a metal compound must be converted to and maintained in a specific valence state; the necessity of using high pressures, which requires special and expensive equipment and operation procedures; and the necessity for removing all but trace quantities of oxygen from the reactants and polymerization zone components, which requires special and expensive separation and purification procedures.

An object of the process of the invention is to provide a process for the preparation of solid polymers or copolymers of normally gaseous olefins. A specific object of the invention is to provide a process for the preparation of solid polymers of ethylene or propylene at relatively low temperatures and relatively low pressures using an inexpensive, easily prepared solid catalyst. A further object is to provide a process for the preparation of solid polymers of ethylene or propylene which does not require use of special separation means for preparing the components of the reaction mixture. Other objects and their achievement in accordance with the invention will be apparent hereinafter.

It has now been found that by contacting, in liquid phase, a mixture of a normally gaseous olefin and oxygen in a liquid hydrocarbon reaction medium with bauxite pretreated as hereinafter described, the olefin is rapidly polymerized to solid polymers. For convenience, the following description of the process of the invention is largely directed to the polymerization of ethylene and the solid polymers obtained therefrom are designated as "polyethylene."

In accordance with an embodiment of the invention, bauxite containing about 10% iron oxide (calculated as $Fe_2O_3$) and about 2% titanium oxide (calculated as $TiO_2$) as natural components is heated to a temperature of about 900° F. in a current of air for about 4 hours. Substantially all of the iron of the resulting composition is present as ferric oxide and substantially all of the titanium is present as titanium dioxide, or titania. A mixture of ethylene and oxygen in a liquid hydrocarbon reaction medium, such as isooctane, is contacted under relatively low temperature and pressure conditions, as hereinafter described, with the so-treated bauxite. Ethylene is thereby polymerized to polyethylene which is readily recoverable from the reaction mixture. The process of the invention thus provides a low temperature, low pressure process for preparing solid polymers of normally gaseous olefins which uses an inexpensive catalyst and in which special separation means for purifying reactants are not required.

Bauxite which contains iron and titanium as natural components, and which is pretreated as hereinafter described, is an essential component of the process. Bauxite is a well known ore composed principally of hydrated oxides of aluminum. Materials usually associated with bauxite, and generally considered to be impurities, are the oxides of iron, silicon and titanium. For most known uses of bauxite the iron content should be low, and processes involving magnetic separation have been developed for removing the iron. Also, an activating step for the bauxite is usually employed. Activation is performed by heating to about 600° F., since the surface area, which is a function of the heating temperature, is a maximum at this temperature. The surface area and activity of bauxite for its usual applications are known to decrease when heated to temperatures above 600° F.

The bauxite catalyst of the process of the present invention must contain at least 0.5% iron, and will usually contain from 1% to 50% iron. Preferably the bauxite contains from 5% to 25% by weight iron since excellent results are obtained with 5% iron and since no significant advantage is obtained with the iron content above about 25% The quantities of iron, herein stated as percent by weight, have been calculated as $Fe_2O_3$. The bauxite catalyst will also contain at least 0.5% titanium, and preferably contains from 1% to 6% titanium (calculated as $TiO_2$). The usual bauxite of commerce, which may have been treated to remove a portion of the iron content, gives good results in the process provided the quantities of iron and titanium are within the defined range. It is permissible to adjust the iron content of bauxite to a desired value by removing a portion of the natural iron content such as by magnetic separation or by leaching with an inorganic acid. It is not permissible, however, to increase the iron content of the bauxite such as by deposition of iron oxide thereon, and carrier materials such as alumina having iron deposited thereon are not operable in the process of the invention. It is essential that the baxuite, prior to use in the process, be pretreated by heating to an elevated temperature in the presence of oxygen or an oxygen containing gas. The bauxite must be heated to a temperature of at least 700° F. and preferably is heated to a temperature of from 800° F. to 1100° F. The time the bauxite must be subjected to the elevated temperature in contact with oxygen varies with the temperature used, i.e., with temperatures in the lower portion of the range heating should be for a period of from about 4 to 6 hours, whereas with temperatures in the higher portion of the range it is only necessary to continue heating for about 1 hour. The presence of other materials, such as oxides of silica, vanadium oxide, and magnesium oxide, which are sometimes associated with bauxite, does not cause deleterious effects.

In accordance with the invention, oxygen is an essential component of the reaction mixture. As shown hereinafter by example, other materials generally considered as operable in processes for polymerizing olefins, such as organic peroxides, do not give comparable results. The quantity of oxygen can be varied substantially and good results obtained. The quantity of oxygen must be at least 0.05% by weight of the ethylene used in order to give operable results. The use of more than about 12% by weight of oxygen, based on the quantity of ethylene used, does not improve the process in either the products produced or the yield obtained, and greater quantities up to about 17% by weight or higher substantially prevent the production of high molecular weight polymers. The preferred range of oxygen in accordance with the invention is from about 0.1% to 5% by weight based on the quantity of ethylene present. Saturation of the hydrocarbon reaction medium with air at room temperature and atmospheric pressure generally results in the presence of a suitable quantity of oxygen.

The process of the invention can be performed as a continuous, semi-continuous or batch type operation. In continuous operation, the catalyst is introduced into a reactor and a mixture of ethylene and oxygen in a liquid, substantially inert hydrocarbon reaction medium is passed over the catalyst. In contacting the catalyst with ethylene, it is essential that the ethylene be present in a liquid hydrocarbon reaction medium. If ethylene in the absence of the hydrocarbon is contacted with bauxite, an oil of aromatic character is produced, no polyethylene is observed, and the activity of the catalyst for producing polyethylene is destroyed. A further requirement of continuous operation is that the admixture of hydrocarbon reaction medium, ethylene and oxygen be pretreated prior to contacting with bauxite. The pretreating is performed by heating the mixture to the operation temperature and is conveniently accomplished by using a preheater immediately prior to the catalyst chamber. It is not permissible to preheat only the hydrocarbon reaction medium and oxygen, with injection of ethylene thereafter, since operable results are not thereby obtained.

In slurry operation, bauxite as above described is suspended in a liquid hydrocarbon reaction medium to form a slurry. In the presence of oxygen, ethylene is introduced such as by bubbling into the slurry. The oxygen can be added prior to, or together with, the ethylene. The preheating step required with continuous operation is not essential in this type of operation apparently due to the difference in reaction conditions, such as the use of the catalyst as a slurry, or to other factors not known with certainty. However, when ethylene and oxygen are introduced together with a hydrocarbon reaction medium, which is preferably the same hydrocarbon medium used in preparing the catalyst slurry, a pretreating step as described for continuous operation is used and excellent results obtained thereby.

The ethylene for use in the process may be obtained from any source such as from the thermal or catalytic cracking of higher boiling hydrocarbons, from the dehydrogenation of ethane, or the dehydration of alcohol. Saturated hydrocarbons such as ethane, propane and butane can be present and act as diluents. Propylene and mixtures of ethylene and propylene can likewise be from any source and good results obtained therewith.

The process of the invention is performed in liquid phase and it is essential that a hydrocarbon which is liquid under the conditions of the process and substantially inert, be employed as the reaction medium. Suitable inert hydrocarbons which can be used include, for example, the pentanes, hexanes, heptanes, octanes, nonanes, decanes, cyclopentanes, alkyl substituted cyclopentanes, cyclohexanes, alkyl substituted cyclohexanes, decalin, mixtures thereof and the like. Aromatic hydrocarbons, such as benzene, toluene, xylene and the like can also be used, but are not preferred since higher yields are obtained through the use of saturated hydrocarbons. The quantity of hydrocarbon diluent to employ does not appear critical but generally must be in the range of from 3 to 1,000 parts by weight per part of bauxite employed.

The temperature of the reaction mixture contacting the solid catalyst is maintained within the range of from 100° F. to 500° F. In general, highest yields are obtained at temperatures of from 175° F. to 375° F., and hence temperatures within this range are preferred. The pressure to employ must be sufficient to maintain liquid phase operation. The pressure should be at least above 100 p.s.i.g. (pounds per square inch gauge), and no advantages are obtained in going above 800 p.s.i.g. Preferably the pressure is maintained within the range of from 100 to 700 p.s.i.g. In continuous operation a space rate of from 0.1 to 10 volumes of reaction mixture per volume of catalyst per hour (v./v./hour) gives good results. In batch operation using bauxite as a slurry in a hydrocarbon medium, a total time of reaction of from 1 to 10 hours is suitable, the optimum time depending on the other variables. In such batch operation it is desirable to continuously or intermittently add ethylene, or a mixture of ethylene and oxygen, to the reactor to maintain the concentration of ethylene in the reaction medium at a desired value. The concentration of ethylene in the hydrocarbon reaction medium, which will vary according to the pressure and particular hydrocarbon reaction medium used, can be varied substantially and good results obtained. The ethylene concentration will generally be from 1% to 40% by weight of the hydrocarbon employed.

The solid polymer products of the invention may be dissolved, suspended or both dissolved and suspended in the hydrocarbon reaction medium. Recovery of the solid polymers can be performed by any convenient means. Preferably the reaction mixture is separated from the catalyst and cooled to a temperature of from about 50° F. to 70° F. to precipitate dissolved polymers. The solid polymers can then readily be recovered by filtration.

After relatively long operation, a portion of the solid polymer products may adhere to the bauxite catalyst. Regeneration can be accomplished by contacting the bauxite with a hot solvent, such as xylene, toluene or benzene to dissolve the solid polymers and heating in contact with air as described for catalyst preparation. If desired, the catalyst can be regenerated simply by heating in air as described for the catalyst preparation, preferably to a temperature in the upper portion of the defined range, namely, to a temperautre of from about 900° F. to 1100° F.

The following examples illustrate embodiments of the process of the invention in which "parts" refers to parts by weight unless otherwise indicated.

*Example 1*

Bauxite of 10 to 20 mesh (United States Series) particle size containing 13% by weight iron oxide (calculated as $Fe_2O_3$), 0.02% by weight vanadium oxide (calculated as $V_2O_5$), about 1% by weight titanium oxide (calculated as $TiO_2$), and about 0.02% by weight magnesium oxide (calculated as MgO), was heated at a temperature of from 900° F. to 1,000° F. in contact with air for about 4 hours. After cooling, the resulting catalytic composition was introduced into a reactor. A mixture of saturated hydrocarbons having from 7 to 9 carbon atoms per molecule and consisting principally of isooctane was saturated with air at room temperature and atmospheric pressure. The resulting hydrocarbons containing oxygen were admixed with ethylene in a weight ratio of aerated hydrocarbons to ethylene of 5, about 0.1% by weight of oxygen, based on the amount of ethylene being present. The resulting admixture was passed through a preheater containing quartz particles at a space velocity of about 1.5 v./v./hour wherein the temperature of the mixture was increased to about 200° F. The heated admixture was then passed through the reactor containing bauxite at a space velocity of about 1.5 v./v./hour. The pressure in the reactor was maintained at 500 p.s.i.g. and the temperature at 200° F. On cooling the effluent from the reactor to about 20° F., a precipitate of finely divided polyethylene formed. The precipitate was filtered and dried. The resulting polyethylene product was a finely divided, colorless solid having a molecular weight of 10,500.

The above procedure was repeated except that the reactor charge was preheated to a temperature of 215° F. and the reactor operated at 215° F. instead of 200° F. A somewhat smaller yield of polyethylene having substantially the same molecular weight was obtained.

Again repeating the same procedure except that a temperature of 350° F. was used. a still smaller yield of polyethylene of substantially the same molecular weight was obtained, the decrease being about ⅔ of the yield obtained at 200° F.

*Example 2*

The procedure of Example 1 was repeated at a temperature of 350° F. except that the hydrocarbon diluent was not saturated with air, i.e., it was substantially free from oxygen. No solid product was obtained.

The procedure of Example 1 was again repeated at 200° F. again without introducing oxygen into the hydrocarbon diluent. No solid product was obtained.

*Example 3*

The procedure of Example 1 was repeated using, in place of the catalyst there described, a comparable catalyst except that the iron content was 20% by weight iron (calculated as $Fe_2O_3$). The temperature employed was 200° F. Results substantially equivalent to those described in Example 1 were obtained; a good yield of white polyethylene being obtained.

*Example 4*

With reaction conditions maintained substantially identical to those described for Example 1 including a temperature of 200° F., the following materials were substituted for the bauxite catalyst: quartz particles, substantially pure alumina particles, and 5% iron oxide (calculated as $Fe_2O_3$) deposited on alumina.

When the foregoing materials were substituted for bauxite no solid products were obtained.

*Example 5*

Example 1 was substantially repeated using the same bauxite catalyst, containing 13% iron (as $Fe_2O_3$), except that instead of pretreating by heating the bauxite in contact with air, it was heated at 300° F. in an atmosphere of nitrogen. Substantially duplicating the operational conditions of Example 1, no solid products were obtained.

*Example 6*

The procedure of Example 1 was substantially repeated using the same bauxite catalyst except that, instead of saturating the hydrocarbon diluent with air, a quantity of benzoyl peroxide was added thereto, 1 part of the peroxide being added for each 85 parts of ethylene used. No solid product was obtained in the process.

Repeating the foregoing run, except that cumene hydroperoxide was substituted for benzoyl peroxide, resulted in no improvement, no solid products being obtained.

*Example 7*

The procedure of Example 1 was again substantially duplicated except that the hydrocarbon reaction medium was not aerated prior to use, i.e., the hydrocarbon reaction medium contained no more than a trace of oxygen. After operating the process for 1 hour, no solid products were obtained. The operation was continued with 1% by weight oxygen based on ethylene, added to the reaction mixture prior to the preheating step. The formation of polyethylene commenced immediately and a good yield thereof having a molecular weight of 12,000 was recovered. In this process, the temperature was maintained at 200° F.

Repeating the foregoing with the hydrocarbon medium saturated with oxygen and a reaction temperature of 295° F., a polyethylene product having a molecular weight of 17,000 was obtained.

*Example 8*

The procedure of Example 1 was substantially duplicated using the same catalyst, except that the weight ratio of aerated hydrocarbons to ethylene was increased to 2.5 and the temperature of the operation was maintained at 275° F. After operation for 100 minutes, during which time about 140 parts of ethylene were passed through the reactor, about 16.5 parts of polyethylene were recovered from the reactor effluent. Unreacted ethylene can be recovered from the reactor effluent and recycled to the process. An increased yield is obtained by operating at a lower temperature.

The foregoing procedure was repeated except that ethylene was added to the reactor feed after the preheater, i.e., only the aerated hydrocarbon medium was preheated. A recoverable quantity of solid product was not produced.

The foregoing examples illustrate embodiments of the process of the invention. When other reaction conditions, within the limits above described, are used, and when propylene or mixtures of ethylene and propylene are used, substantially equivalent results are obtained.

The products of the invention can vary from soft, wax-like polymers having molecular weights of from about 300 to 800 to hard polymers having molecular weights of up to about 50,000 or more. The products are useful as thin films for wrapping food products and the like, as pipes for transporting fluids, as containers for corrosive fluids, and the like. Such articles can be made by molding, extrusion, or other fabrication processes.

The invention claimed is:

1. Process for polymerizing an olefin selected from the group consisting of ethylene, propylene, and mixtures of ethylene and propylene, which comprises contacting a mixture of said olefin, at least 0.05% by weight of oxygen, based on the olefin, and a liquid hydrocarbon reaction medium with bauxite containing from 0.5% to 50% iron (calculated as $Fe_2O_3$) and at least 0.5% titanium (calculated as $TiO_2$), said bauxite having been heated to a temperature of at least 700° F. in contact with oxygen prior to said contacting with said mixture.

2. Process according to claim 1 wherein said olefin is ethylene.

3. Process according to claim 1 wherein said olefin is propylene.

4. Process according to claim 1 wherein said olefin is a mixture of ethylene and propylene.

5. Process for the continuous polymerization of olefins to solid polymers which comprises pretreating bauxite containing from 0.5% to 50% by weight iron (calculated as $Fe_2O_3$) and at least 0.5% titanium (calculated as $TiO_2$), by heating to a temperature of from 700° F. to 1100° F. in contact with oxygen, continuously passing over the pretreated bauxite a mixture of an olefin selected from the group consisting of ethylene, propylene, and mixtures of ethylene and propylene, and at least 0.05% by weight oxygen, based on the olefin, contained in a liquid hydrocarbon reaction medium, at a temperature of from 100° F. to 500° F., a pressure of from 100 p.s.i.g. to 800 p.s.i.g., and a space velocity of from 0.1 to 10 volumes of reaction mixture per volume of catalyst per hour, and recovering solid polymers of said olefin from the reaction mixture.

6. Process according to claim 5 wherein said olefin is ethylene.

7. Process according to claim 5 wherein said olefin is propylene.

8. Process according to claim 5 wherein said olefin is a mixture of ethylene and propylene.

9. Process for the polymerization of olefins to solid polymers which comprises pretreating bauxite containing from 0.5% to 50% by weight iron (calculated as $Fe_2O_3$) and at least 0.5% by weight titanium (calculated as $TiO_2$) by heating to a temperature of from 700° F. to 1100° F. in contact with oxygen, forming a slurry, in a liquid hydrocarbon reaction medium, introducing an olefin selected from the group consisting of ethylene, propylene, and mixtures of ethylene and propylene into the so-formed slurry, in the presence of at least 0.05% by weight of oxygen, based on the olefin, at a temperature of from 100° F. to 500° F. and a pressure of from 100 p.s.i.g. to 700 p.s.i.g., and recovering solid polymers of the olefin from the reaction mixture.

10. Process according to claim 9 wherein the olefin is ethylene.

11. Process according to claim 9 wherein the olefin is propylene.

12. Process according to claim 9 wherein the olefin is a mixture of ethylene and propylene.

13. Process for the polymerization of ethylene, to solid polyethylene which comprises contacting a mixture of ethylene, from 0.05% to 17% by weight of oxygen, based on the ethylene, and a liquid hydrocarbon reaction medium with bauxite containing from 0.5% to 50% iron (calculated as $Fe_2O_3$) and from 0.5% to 6% titanium (calculated as $TiO_2$), said bauxite having been heated to a temperature of from 700° F. to 1100° F. in contact with oxygen prior to contacting with said mixture.

14. Process according to claim 13 wherein said mixture is contacted with said bauxite at a temperature of from 100° F. to 500° F., and at a pressure of at least 100 p.s.i.g.

References Cited in the file of this patent

UNITED STATES PATENTS

| | | |
|---|---|---|
| 2,381,198 | Bailey et al. | Aug. 7, 1945 |
| 2,406,081 | La Lande et al. | Aug. 20, 1946 |